United States Patent [19]
Schinabeck

[11] Patent Number: 5,423,932
[45] Date of Patent: Jun. 13, 1995

[54] APPARATUS FOR SEALING LEAKS

[75] Inventor: Rainer Schinabeck, Scituate, Mass.

[73] Assignee: American Velodur Metal, Inc., Scituate, Mass.

[21] Appl. No.: 158,695

[22] Filed: Dec. 2, 1993

[51] Int. Cl.⁶ ............................................. B32B 35/00
[52] U.S. Cl. ...................... 156/94; 156/215; 156/295; 156/493; 138/97; 138/98; 138/99
[58] Field of Search ........... 156/94, 215, 295, 493, 156/DIG. 42, 581, 98, 481, 579; 138/97, 98, 99; 264/36

[56] References Cited

U.S. PATENT DOCUMENTS

| | | | |
|---|---|---|---|
| 2,069,722 | 2/1937 | Merrill | 138/99 |
| 2,236,913 | 4/1941 | Merrill | 138/99 |
| 3,823,050 | 7/1974 | Mers | 156/493 |
| 4,568,589 | 2/1986 | Briggs | 156/94 |
| 4,756,337 | 7/1988 | Settineri | 138/99 |

FOREIGN PATENT DOCUMENTS

| | | | |
|---|---|---|---|
| 0629399 | 9/1978 | U.S.S.R. | 138/97 |
| 1086290 | 4/1984 | U.S.S.R. | 138/97 |
| 1263959 | 10/1986 | U.S.S.R. | 138/97 |

*Primary Examiner*—Michael W. Ball
*Assistant Examiner*—Sam Chuan Yao
*Attorney, Agent, or Firm*—Schwartz & Weinrieb

[57] ABSTRACT

Leaks can be sealed quickly by methods employing a flexible patch applied by a resilient applicator that can be caused to exert sufficient force against the patch and the leaking surface to stop fluid flow while a leak sealant is curing. The resilient applicator comprises a resilient deformable member having a wall that defines a cavity for receiving the patch entirely within the cavity together with a leak sealant for application to the leak.

14 Claims, 2 Drawing Sheets

APPARATUS FOR SEALING LEAKS

BACKGROUND OF THE INVENTION

This invention relates to the sealing of leaks, and more particularly to a leak sealing patch and a hand tool for applying such a patch to a fluid containing body and to methods using such a tool and patch. Prior leak sealing tools and methods, as exemplified by U.S. Pat. No. 3,645,816, required that the surface area surrounding a leak be thoroughly cleaned before a patch could be applied, and also that any fluid pressure within the leaking body be eliminated by draining fluid from the body. Also, the tools used to apply leak seal patches were made from rigid materials that could not be deformed to conform to the shape of the surface area around the leak. This made it necessary to have a plurality of tools for applying patches with each tool having a shape conforming to a single specific area or contour.

OBJECTIVES OF THE INVENTION

Accordingly, it is an object of this invention to provide improved applicators, patches and methods for sealing leaks.

Another object is to seal leaks in fluid containing bodies without requiring that such bodies be drained or that their internal fluid pressure be eliminated.

A further object is to seal leaks in the outer surface of bodies that are immersed in liquid.

A still further object is to facilitate the use of a single applicator for sealing leaks in different types of bodies having different sizes and shapes.

Another object is to provide a patch that can be used to seal leaks in bodies of differing shapes and sizes.

An additional object is to provide an applicator for a leak sealing patch that can be used on non-flat, non-horizontal surfaces without permitting the patch to fall out of the applicator.

Still another object is to provide a quick curing leak sealing patch that can be used to seal pressurized and submerged leaks.

A further object is to provide methods for quickly sealing leaks under widely varying conditions in bodies of differing shapes.

A still further object is to provide relatively simple, economical and durable leak sealing tools and patches, and methods of using such tools and patches that can be employed by persons that do not have special training or skills and which do not possess defects found in similar prior art devices and methods.

Other objects and advantages of the invention will be found in the specification and claims and the scope of this invention will be set forth in the claims.

DESCRIPTION OF THE INVENTION

Figure 1:
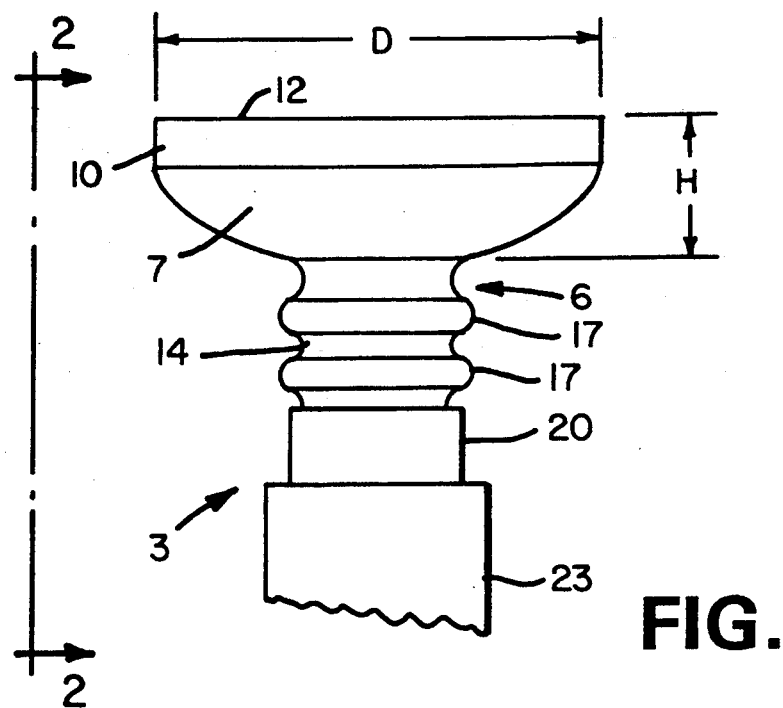
FIG. 1 is a side view of an embodiment of the invention.

The drawing illustrates methods, tools and patches in accord with this invention for sealing leaks 1 in a fluid containing body such as a cylindrical pipe 2. A hand tool in the form of an applicator 3 is used to secure a leak sealing patch 5 to the outside surface of pipe 2 in the area surrounding the leak.

Applicator 3 comprises a generally circular, hollow, resilient, deformable unitary member 6 having a cup-shaped wall portion 7 that defines a circular cavity 8 at one of its ends 10. A peripheral rim or flange 11 extends inwardly toward the center of the applicator so as to surround and overlie cavity 8. Flange 11 defines the circular terminal outer surface 12 of member 6. Wall 7 has at its center within cavity 8 a circular protrusion that defines a hollow blister 13 that extends toward outer surface 12. Blister 13 is perforated by a circular center hole 14. A generally circular hollow tubular portion 15 extends from wall 7 in the direction opposite to surface 12 and provides resilient deformable member 6 with a hole 16 through its center. Tubular portion 15 may be surrounded by a pair of integral circumferential stabilizing ribs 17. The diameter D at end 10 of cup-shaped wall 7 may be in the range of about one to six inches, and the height H may be within a ratio of about 1:1 to about 1:5 of the diameter D.

A circular peripheral rim 18 surrounds and extends outwardly away from tubular portion 15 at the opposite end 19 of member 6. A threaded end cap 20 has a circular peripheral flange 21 which overlies and captures rim 18 so as to connect the end cap to member 6. Applicator 3 includes a rigid handle 23 which has a threaded end 24 that screws into end cap 20 for connecting the handle to member 6. An integral rigid cylindrical plunger or rod portion 22 of reduced diameter extends from end 24 into tubular portion 15. A bushing 25 inserted into end 19 protects and supports tubular portion 15 and helps hold member 6 and handle 23 together.

Figure 2:
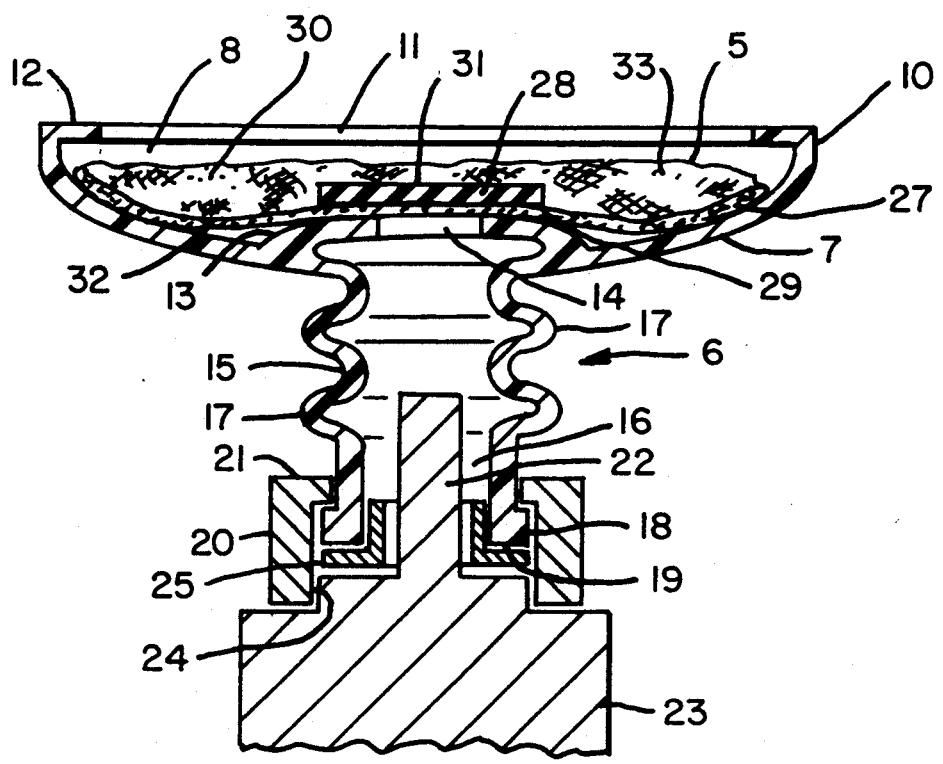
FIG. 2 is a cross sectional view taken along the line 2—2 in FIG. 1.
Figure 3:
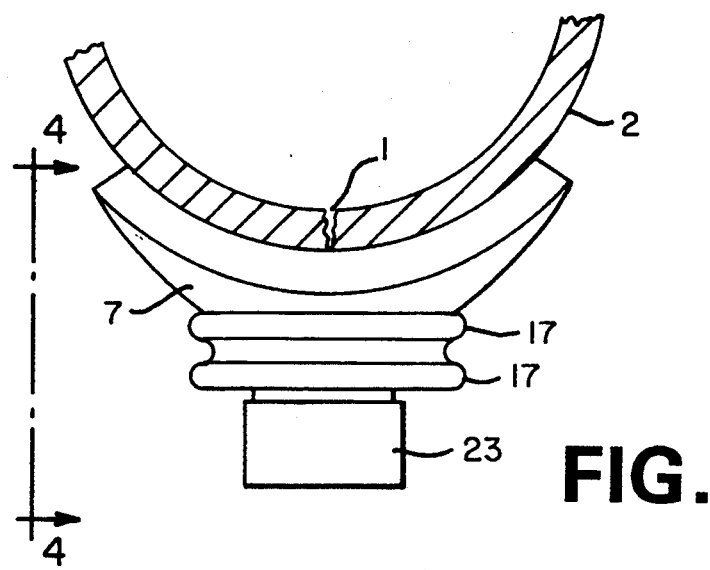
FIG. 3 is a partial side view of the application of this invention deformed against a curved body.
Figure 4:
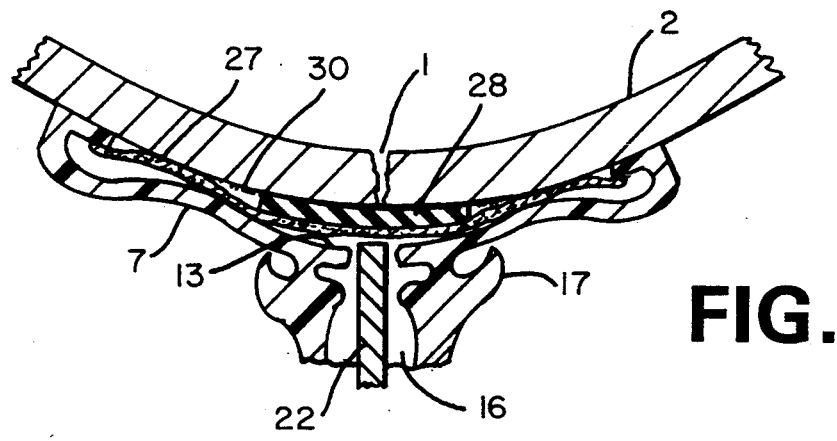
FIG. 4 is a cross sectional view taken along the line 4—4 in FIG. 3.
Figure 5:
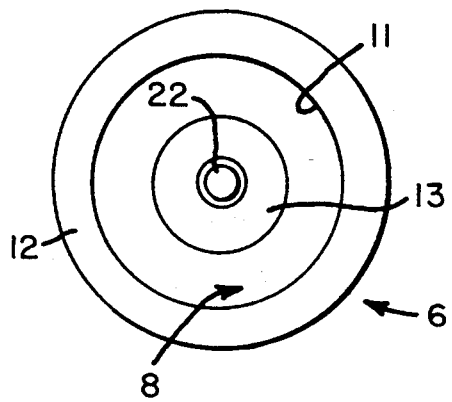
FIG. 5 is an end view of the applicator shown in FIG. 1 with the patch removed.
Figure 6:
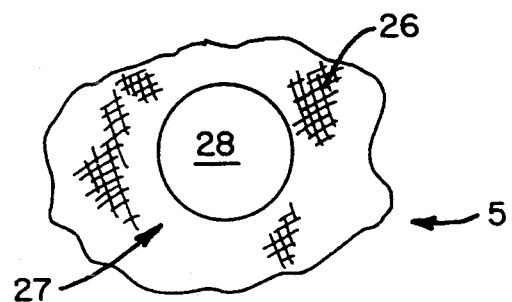
FIG. 6 is a plan view of a patch in accord with this invention with the sealant omitted.

Patch 5 includes a piece 26 of flexible fluid permeable fabric. Ideally the area of piece 26 will be sufficient to cover leak 1 and surround the surface of body 2 on all sides of the leak. However, when the leak is the result of a large crack or other rupture, two or more overlapping patches 5 may have to be applied. The center portion 27 of piece 26 should be reinforced so that it is flexible but fluid-impervious and sufficiently strong to withstand enough applied force to stop pressurized fluid from flowing out of leak 1 while the seal is curing. Center portion 27 may comprise a reinforcing flexible sheet member 28 having one side 29 secured to piece 26 by a bonding agent or by heat fusion. The center portion 27 can also be reinforced by impregnating piece 26 with rubber or plastic that will harden into a strong flexible fluid impervious mass. As shown in FIGS. 2 and 4 sealant 30 substantially covers and adheres to piece 26 and the opposite side 31 of sheet member 28.

Piece 26 may be made from any strong flexible fabric comprising interconnected strands, such as woven and non-woven cloth, tape and mesh, and piece 26 may be made from natural, synthetic, metal or ceramic fibers. Preferably piece 26 is made from extremely high tensil strength Kevlar or Aramid aromatic polyamid fibers. Sheet member 28 may be made from flexible fluid-impervious material that is easily bondable or fusible to the material of piece 26. Hard natural rubber or synthetic rubbers such as styrene-butadiene-styrene may be used for sheet member 28, but preferably member 28 should be made from Neoprene rubber. The sealant 30 should cure rapidly between temperatures of about 5 to 25 degrees C. without the addition of external heat and should securely bond to piece 26 and sheet member 28. Preferably, sealant 30 is an epoxy resin that cures in about one minute without external heat. Examples, of suitable sealants are disclosed in U.S. Pat. Nos. 4,569,956; 4,565,837 and 4,396,754. Also, usable are the slightly slower curing materials disclosed in U.S. Pat. Nos. 3,976,613; 3,922,358 and 3,556,831. Resilient deformable member 6 should be made from a material to which sealant 30 does not adhere, and preferably is made from silicone rubber.

Figure 7:
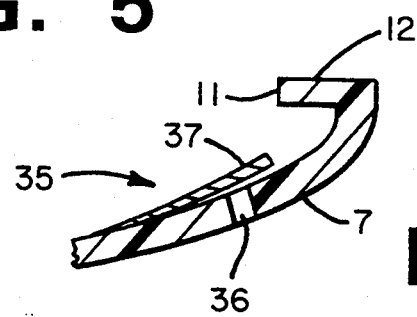
FIG. 7 is a partial cross sectional side view showing another embodiment of the invention.

FIG. 7 shows another embodiment that is identical to that of FIGS. 1–6, except that pressure release means 35 has been placed inside of cup-shaped wall 7. A small hole 36 through wall 7 is covered by a flexible flap valve 37 that will close the hole. When pressure within the applicator 3 needs to be released, a small rod or wire can be inserted through hole 36 and flap 37 can be pushed away from the hole to release the pressure.

This invention also includes methods of sealing leaks which will be apparent from the operation of applicator 3. Piece 26 is cut to a size that will enable the entire patch 5 to fit within cup-shaped member 7, and sheet member 28 is fused or bonded to the central area of piece 26. The patch is placed inside of cup-shaped member 7 and a generous amount of sealant 30 is spread over the entire area member 28 and over essentially the entire area of piece 26. Sealant 30 should permeate the fibers and/or the spaces between the fibers or strands of piece 26. Patch 5 is surrounded by resilient deformable member 7 and one side 32 of the patch is supported within the applicator and its opposite side 33 is exposed through the outer surface 12 at the applicator's open end 10. By overlapping patch 5 with flange 11, patch 5 is prevented from escaping from the applicator when open end 10 must be tilted sideways or downwardly. Outer surface 12 is placed against the surface of body 2 surrounding and adjacent leak 1. Force is applied at the opposite end of member 6 through handle 23 so as to deform flange 11 and place essentially the entire outer surface 12 into contact with the surface of body 2. Sufficient additional force is applied by handle 23 to deform wall 7 and blister 13 against side 32 of the patch and force side 33 of the patch into contact with the area of body 2 surrounding the leak. The effect of blister 13 and wall 7 deforming and pressing against piece 26 is to generally mold or shape piece 26 and sheet member 28 to the contour of the surface of body 2. Applying additional force to handle 23 will compress tubular portion 15 and cause rod portion 22 to move through holes 14 and 16 into contact with side 32 opposite the central part of sheet member 28. Sufficient pressure should now be applied to sheet member 28 and piece 26 by pressing on rod portion 22 to stop fluid from escaping through leak 1. A relatively thin layer of sealant 30 will be trapped between sheet member 28 and body 2, and piece 26 will hold additional sealant 30 in contact with the surface of body 2 around the leak. The pressure from cup 7 and rod portion 22 should be maintained against patch 5 until the sealant 30 has cured and the leak has been sealed. The force is then removed from the handle end of applicator 3 and the applicator is pulled away from body 2 and patch 5. The applicator will return to its original shape, but patch 5 will continue to conform to the shape of body 2 in the area around leak 1. The fabric from which piece 26 is made acts as the medium for holding and shaping sealant 30 before and during the curing process and as reinforcement for strengthening the sealant after it has cured. Additional sealant 30 now may be spread over and around patch 5 to reinforce the seal.

It has thus been shown that by the practice of this invention only one flexible deformable applicator 3 is required for sealing leaks in various types of vessels, tanks, pipes and containers of many different sizes and shapes. Applicator 3 can be used to apply patches 5 on overhead surfaces and on horizontal and vertical surfaces without permitting escape of the patch; flange 11 overlaps patch 5 and holds the patch inside of cup shaped wall 7 when the handle 23 is pointed horizontally or downwardly. Great force can be applied by plunger 22 to hold sheet member 28 tightly against the surface of the body being repaired so fluid does not have to be drained from the body nor does internal fluid pressure have to be relieved. Flange 11 also prevents patch 5 from being pushed away or sliding away from the applicator or the area around the leak when plunger 22 applies a large force against the patch. Reinforcing ribs 17 prevent lateral collapse of tubular member 15 when force is applied by the plunger. The surface around the leak does not have to be totally clean and the applicator 3 can apply patches 5 to bodies submerged in water, hydrocarbons or oil, as for example when repairing ship hulls or transformers. Pressurized leaks up to 90 psi have been sealed by this invention.

While the invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. It is intended that the appended claims cover all such changes as fall within the true spirit and scope of the invention.

What is claimed is:

1. An applicator for securing a leak sealing patch to a body comprising: a resilient deformable member having a wall that defines a cavity for receiving such a patch entirely within said cavity prior to said member being deformed, said cavity being located at one end of said resilient deformable member, said resilient deformable member having an outer surface that surrounds said cavity and said outer surface comprising a peripheral flange that overlies said cavity, and said patch disposed within said cavity, said wall being deformable against one side of said patch against a surface of said body when said outer surface of said resilient deformable member is placed against said body and force is applied to an end of said resilient deformable member opposite to said one end.

2. The applicator defined in claim 1, wherein said wall is generally circular and cup shaped.

3. The applicator defined in claim 1, further comprising said wall of said resilient deformable member defining a blister within said cavity that protrudes toward said outer surface.

4. The applicator defined in claim 1, wherein said resilient deformable member has a hole through its center.

5. The applicator defined in claim 4, further comprising said resilient deformable member having a hollow tubular portion extending from said wall in a direction opposite to said outer surface.

6. The applicator defined in claim 5, wherein said tubular portion is surrounded by a circumferential rib.

7. The applicator defined in claim 5, further comprising a handle having a plunger extending into said tubular portion, said plunger being movable through said tubular portion into contact with said one side of said patch when said wall is deformed so as to force said opposite side of said patch into contact with said body.

8. The applicator defined in claim 1, for securing a leak-sealing patch to a body having a fluid leak comprising said resilient deformable member being circular and hollow and having a hole through its center, said wall being cup-shaped, said outer surface of said resilient deformable member defining a peripheral flange that extends inwardly and overlies said cavity, said cup-shaped wall defining within said cavity a blister that protrudes toward said peripheral flange, said resilient deformable member having a hollow tubular portion extending from said wall toward an end opposite to said one end, said tubular portion being surrounded by a plurality of circumferential ribs, and said cup-shaped wall and said blister being deformable against one side of said patch so as to hold an opposite side of said patch against a surface of said body around such a leak when said peripheral flange is placed against said surface of said body and force is applied from said opposite end against said tubular portion.

9. The applicator defined in claim 8, further comprising a handle having a plunger extending into said tubular portion, said plunger being movable into contact with said one side of said patch when said wall is deformed so as to force said patch into leak-sealing contact with said body at said leak.

10. The applicator defined in claim 8, further comprising means for relieving fluid pressure within said cavity.

11. Means for sealing a fluid leak in a body, comprising:
A. a leak sealing patch for covering a surface of said body adjacent said leak, said patch comprising a piece of fluid-permeable flexible fabric having a flexible fluid-impervious pressure-resistant center portion;
B. a quick curing adhesive sealant covering said one side of said patch, said sealant being bondable to said fabric and center portion; and
C. an applicator for said patch comprising a resilient deformable member having a wall that defines a cavity that receives said patch and said sealant entirely within said cavity prior to said member being deformed, said resilient deformable member having an outer surface that surrounds said cavity, said wall being deformable against a side of said patch opposite to said one side of said patch so as to deform and hold said patch and said sealant on said one side of said patch against said surface of said body adjacent said leak, and said wall of said resilient deformable member being made from a material to which said sealant does not adhere.

12. The invention defined in claim 11, wherein said sealant comprises an epoxy resin.

13. The invention defined in claim 11, wherein said resilient deformable member is made from material comprising silicone rubber.

14. The invention defined in claim 11, wherein said center portion of said patch comprises neoprene rubber.

* * * * *